United States Patent [19]
Hirschson

[11] 3,935,054
[45] Jan. 27, 1976

[54] APPARATUS FOR MANUFACTURING NECK-TIES

[76] Inventor: David Hirschson, 25 Linksfield Drive, Johannesburg, South Africa, 2001

[22] Filed: July 25, 1974

[21] Appl. No.: 491,629

Related U.S. Application Data

[62] Division of Ser. No. 137,446, April 26, 1971, Pat. No. 3,842,436.

[30] Foreign Application Priority Data

Apr. 24, 1970   South Africa.................... 70/2749

[52] U.S. Cl. .................. 156/443; 156/583; 223/1; 223/37
[51] Int. Cl.² .................... B29H 7/04; A41H 33/00
[58] Field of Search............... 156/443, 474, 91–93, 156/475, 461, 465, 467, 477–480, 482–485, 156/200, 201, 226, 227, 196; 223/38, 223/37, 28, 30, 31, 81, 82; 2/144, 2/146–147, 157; 112/121.22

[56] References Cited

UNITED STATES PATENTS

| | | | |
|---|---|---|---|
| 1,916,507 | 7/1933 | Green et al. | 2/146 X |
| 2,126,835 | 8/1958 | Steinberger | 2/146 |
| 2,286,224 | 6/1942 | Naftali | 223/38 X |

Primary Examiner—Douglas J. Drummond
Assistant Examiner—David A. Simmons
Attorney, Agent, or Firm—Kenyon & Kenyon Reilly Carr & Chapin

[57] ABSTRACT

Apparatus for securing a lining in an end of a neck-tie comprising; a supporting surface for supporting the end of a strip of tie material containing heat fusible fibres, means for forming a pleat along the longitudinal axis of said strip of tie material, means for clamping a lining against said strip of tie material along two lines diverging from said pleat, and means for providing heat at said two-lines to fuse the lining and material together at said lines and thereby form a pointed end to the lining and material.

4 Claims, 4 Drawing Figures

APPARATUS FOR MANUFACTURING NECK-TIES

This application is a divisional application of U.S. application Ser. No. 137,446 filed Apr. 26, 1971 now U.S. Pat. No. 3,842,436.

The invention relates to apparatus for manufacturing neck-ties having pointed ends and more particularly to apparatus for securing a lining in a pointed end of a neck-tie.

The lining referred to is usually secured in the end of a neck-tie by stitching. This requires a certain amount of skill and is also time consuming.

It is accordingly an object of the invention to provide apparatus with which the above disadvantages way be lessened when ties are made of material containing heat fusible fibres.

According to the invention there is provided apparatus of the kind set forth comprising; a supporting surface for supporting the end of a strip of tie material containing heat fusible fibres, means for forming a pleat along the longitudinal axis of said strip of tie material, means for clamping a lining against said strip of tie material along two lines diverging from said pleat, and, means for providing heat at said two lines to fuse the lining and material together at said lines and thereby form a pointed end to the lining and material.

Further features of the invention provide for the means for forming said pleat to comprise a groove formed in said supporting surface and extending across it, and, a blade pivoted adjacent said groove and aligned with it, for the means for clamping said lining against said strip of the material to comprise an arm displacable towards and away from said supporting surface and for the means for providing heat to comprise a wire adapted to be electrically heated, the wire being mounted on said arm or on said supporting surface.

A preferred embodiment of the invention is described below by way of example, reference being made to the accompanying drawings in which.

Figure 1:
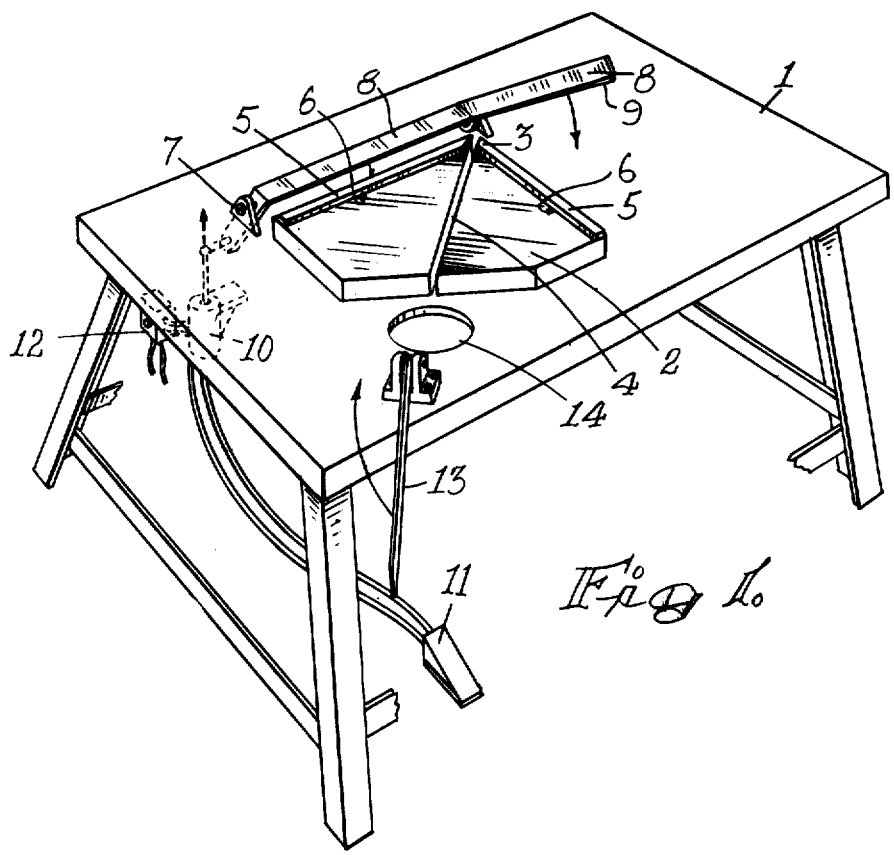
FIG. 1 is a perspective view of an apparatus according to the invention.

The apparatus comprises a table 1 having a supporting surface 2 thereon. The supporting surface has at least one right angled corner 3 from which a groove 4 extends diagonally, the groove conveniently having the top surface of the table 2 as its base.

The two edges 5 of the supporting surface defining the right angle are provided with a layer 6 of a suitable substance of the type which enables material to be heat fused by clamping it between this layer and a heated element.

Mounted adjacent the supporting surface 2 on horizontal pivots 7 is an arm 8 having a right angled bend therein, the pivot axes being parallel to one portion of the arm. The arm is provided along its length with a wire 9 adapted to be electrically heated. When the arm 8 is pivoted onto the supporting surface 2, the wire 9 bears on the layer 6.

Operation of the arm is preferably effected through the action of a solenoid 10 and foot operable switch 11 but the arm may be mechanically linked to a foot operable pedal or may be hand operable. A timing switch 12 is provided to allow current to flow through the wire 9 for a predetermined period of time when the arm 8 is clamped against the supporting surface.

A blunt edged blade 13 is pivoted to the table 1 and is aligned with the groove 4. A hole 14 is provided in the table through which a strip of material will extend whilst a lining is secured thereto.

Figure 2:
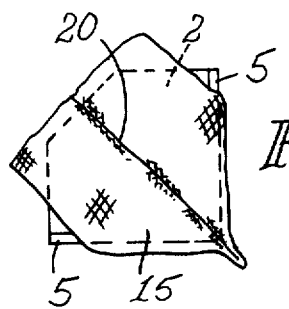
FIGS. 2 to 4 are diagrams illustrating the method of putting the apparatus to use.
Figure 3:
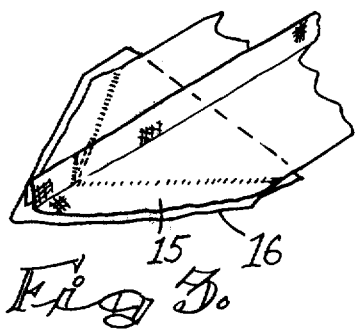

In use, the end 15 of a strip of tie material containing heat fusible fibres is laid face upwards over the supporting surface so that the groove 4 coincides with the longitudinal axis of the strip of material. The end 15 is so placed that the material extends across the layers 6 on the supporting surface. The blade 13 is then rotated into the groove thereby urging the material into the groove to form a pleat 20 therein as shown in FIG. 2. The blade is then removed leaving the tie material in this position and a lining 16 is placed over the tie material to extend across it. The arm 8 is then operated, the wire 9 fusing the two pieces of material together along lines 17 diverging from the pleat 20 to form a pointed end to the lining and material.

The material and lining are removed from the supporting surface and the material is heat fused to itself along a line 18 extending across the pleat 20 from the point of divergence of the lines 17. This can be done with a separate heat sealing machine (not shown) of a known type.

Figure 4:
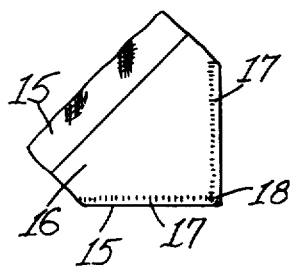

It is envisaged that at least the end of the supporting surface may be made movable and provided with a short heat sealing wire to enable the sealing on line 18 to be performed whilst the tie material is still located in the groove, thereby eliminating the separate sealing operation. All three lines of heat intersect at the point of the lining and material and the heating wire is such that the material is substantially "cut" along the lines of heat. Thus the excess material 19 may simply be removed and the end of the tie turned inside out to provide the finished assembly illustrated in FIG. 4.

It will be appreciated that the above-described operation may be swiftly and easily effected by unskilled operators.

It will be understood that the invention may be applied to any types of heat fusible cloths which contain at least an appreciable amount of heat fusible fibres and has been found to be particularly suitable when used on polyester cloths. It is envisaged that the invention will operate effectively even on cloths containing cotton or the like in which case the molten material from the heat fusible fibres will tend to lock onto the cotton or other threads.

The arm 8 may be replaced by a clamp guided for vertical movement. Also, the wire 9 may be mounted on the supporting surface instead of on the arm or clamp, as shown by dotted line 21 in FIG. 1.

What I claim as new and desire to secure by Letters Patent is:

1. Apparatus for securing a lining in an end of a neck-tie comprising;
    a supporting surface for supporting the end of a strip of tie material containing heat fusible fibres,
    means for forming a pleat along the longitudinal axis of said strip of tie material,
    means for clamping a lining against said strip of tie material along two lines diverging from said pleat, and
    means for providing heat at said two-lines to fuse the lining and material together at said lines and thereby form a pointed end to the lining and material.

2. Apparatus as set forth in claim 1 wherein the means for forming said pleat comprises;
   a groove formed in said supporting surface and extending across it, and,
   a blade pivoted adjacent said groove and aligned with it.

3. Apparatus as set forth in claim 1 wherein the means for clamping said lining against said strip of tie material comprises an arm displacable towards and away from said supporting surface and wherein the means for providing heat comprises a wire adapted to be electrically heated, the wire being mounted on said arm.

4. Apparatus as set forth in claim 2 wherein the means for clamping said lining against said strip of tie material comprises an arm displacable towards and away from said supporting surface and wherein the means for providing heat comprises a wire adapted to be electrically heated, the wire mounted on said supporting surface.

* * * * *